US009114373B2

(12) United States Patent
Misawa et al.

(10) Patent No.: US 9,114,373 B2
(45) Date of Patent: Aug. 25, 2015

(54) PLASMA GENERATION DEVICE (71) Applicant: Saga University, Saga (JP)

(72) Inventors: Tatsuya Misawa, Saga (JP); Nobuya Hayashi, Saga (JP)

(73) Assignee: SAGA University, Saga (JP)

( * ) Notice: Subject to any disclaimer, the term of this patent is extended or adjusted under 35 U.S.C. 154(b) by 0 days.

(21) Appl. No.: 14/274,261

(22) Filed: May 9, 2014

(65) Prior Publication Data
US 2014/0328728 A1 Nov. 6, 2014

Related U.S. Application Data (63) Continuation of application No. PCT/JP2012/079297, filed on Nov. 12, 2012.

(30) Foreign Application Priority Data

Nov. 11, 2011 (JP) .................................. 2011-247680

(51) Int. Cl.
| H01J 17/26 | (2012.01) |
| H01J 61/28 | (2006.01) |
| B01J 19/08 | (2006.01) |
| H05H 1/24 | (2006.01) |

(52) U.S. Cl.
CPC ............... *B01J 19/088* (2013.01); *B01J 19/08* (2013.01); *H05H 1/2406* (2013.01); *B01J 2219/0809* (2013.01); *H05H 2001/2412* (2013.01); *H05H 2001/2418* (2013.01)

(58) Field of Classification Search
CPC .. B01J 19/088; B01J 19/08; B01J 2219/0809; H05H 1/2406; H05H 2001/2418; H05H 2001/2412
See application file for complete search history.

(56) References Cited

U.S. PATENT DOCUMENTS

| 4,954,320 A | * | 9/1990 | Birmingham et al. ... 422/186.04 |
| 5,284,556 A | * | 2/1994 | Rich .............................. 204/164 |
| 2006/0196424 A1 | | 9/2006 | Swallow et al. |
| 2008/0145553 A1 | * | 6/2008 | Boulos et al. ................. 427/447 |
| 2009/0044661 A1 | * | 2/2009 | Li et al. ........................ 75/10.19 |
| 2013/0098753 A1 | * | 4/2013 | Sanematsu ..................... 204/164 |
| 2013/0116682 A1 | * | 5/2013 | Koo et al. ....................... 606/41 |
| 2014/0069853 A1 | * | 3/2014 | Lee et al. ...................... 210/149 |

FOREIGN PATENT DOCUMENTS

| JP | 2005332784 A | 12/2005 |
| JP | 2007059385 A | 3/2007 |
| JP | 2009212129 A | 9/2009 |

(Continued)

*Primary Examiner* — Donald Raleigh
(74) *Attorney, Agent, or Firm* — Dingman, McInnes & McLane, LLP (57) ABSTRACT

There is provided a plasma generation device capable of suppressing arc discharge in which discharge is localized to cause a high temperature, and allowing atmospheric discharge plasma to be stably generated with a high generation efficiency in a low temperature at about a room temperature without being spatially biased. The plasma generation device arranged with a plurality of electrodes facing each other includes a discharge position control unit, which is arranged between each of the plurality of electrodes, and is formed by containing an inverse characteristic material composed of a fluid having polarizability and a property that dielectric constant decreases with an increase in temperature, in a container formed of a dielectric material, wherein the inverse characteristic material is spaced apart from each of the plurality of electrodes.

16 Claims, 9 Drawing Sheets

(56) References Cited

FOREIGN PATENT DOCUMENTS

| | | |
|---|---|---|
| JP | 2010036152 A | 2/2010 |
| JP | 2010051941 A | 3/2010 |
| JP | 2012033385 A | 2/2012 |

* cited by examiner

PLASMA GENERATION DEVICE

CROSS-REFERENCE TO RELATED APPLICATIONS

This application is a continuation of International Application No. PCT/JP2012/079297, filed Nov. 12, 2012, now pending, which claims priority to Japanese Application No. 2011-247680, filed Nov. 11, 2011, the contents of which are incorporated herein by reference.

TECHNICAL FIELD

The present invention relates to a plasma generation device for generating discharge plasma, particularly to a plasma generation device for generating a large volume of stable atmospheric plasma.

BACKGROUND

Atmospheric plasma is a plasma to be generated with an electric discharge under an atmospheric pressure. The atmospheric plasma is utilized in a variety of technologies, such as disinfection, bacterial killing, antisepsis, gas decomposition, and material surface plasma-modification, and is broadly used for generation of ozone to be used for various sterilization, water purification technologies using ozone, sterilization technologies using oxygen plasma in a medical field, and more. As plasma generation devices for generating atmospheric plasma, a conductive electrode such as metal, and a dielectric electrode on the surface of which is laminated with a dielectric material are mainly used. In a variety of needs including the uses described above, a high-quality atmospheric plasma generation technology for stably generating plasma without being localized at a certain area is demanded. As for a conventional plasma generation device, there is a technique in which a solid dielectric member is provided on at least one facing surface of a pair of electrodes facing each other to adsorb and fix an object to be treated, thereby carrying out uniform plasma treatment on the object to be treated (refer to, for example, Patent Document 1). And, there is a technique in which a recess serving as a space for injecting a dielectric material therein is provided at the center of an upper electrode for an etching device, and the dielectric material is supplied into the recess depending on an in-plane distribution of electric field intensity of plasma to be generated, thereby uniformizing the in-plane distribution of the electric field intensity (refer to, for example, Patent Document 2). Also, as for a conventional plasma generation device, there is a technique in which a first electrode to which a discharge voltage is applied from a power supply unit, a dielectric material which is spaced apart from the first electrode with a predetermined interspace and surrounds the first electrode, a liquid dielectric material to be filled in the interspace between the first electrode and the dielectric material, and a second electrode disposed to be spaced apart from the dielectric material with a predetermined interspace are provided, thereby suppressing excess plasma generated at areas such as gaps between the electrodes and boundary regions around the electrodes (refer to, for example, Patent Document 3). Further, there is a technique in which an object gas to be treated and a carrier gas are passed through the inside of an inner tube of a double tubular dielectric material, a conductive liquid to be passed through between the inner tube and an outer tube is served as an outer electrode, blade parts are arranged, and a conductive continuous coil laid at a longitudinal outer circumference area of the blade parts is served as an inner electrode, thereby carrying out treatment on the object gas to be treated passing through the inside of the inner tube (refer to, for example, Patent Document 4).

As described above, a device for generating uniform plasma on an object to be treated, a device for suppressing generation of excess plasma due to a configuration in which an electrode is immersed in a liquid, a device for generating plasma so as to efficiently carry out treatment on an object gas to be treated, have been proposed as conventional plasma generation devices.

RELATED REFERENCES

Patent Document 1: Japanese Unexamined Patent Application Publication No. 2005-332784
Patent Document 2: Japanese Unexamined Patent Application Publication No. 2009-212129
Patent Document 3: Japanese Unexamined Patent Application Publication No. 2007-59385
Patent Document 4: Japanese Unexamined Patent Application Publication No. 2010-51941

SUMMARY

Conventional atmospheric plasma generation devices (being used in a low temperature) require a voltage higher than that of low pressure plasma generated under a low pressure condition due to a characteristic of the atmospheric plasma that the plasma is generated under an atmospheric pressure. In a discharge using a high voltage, the discharge has a tendency to readily shift from a glow discharge, in which the discharge is not localized and the plasma can be used in a low temperature at about a room temperature, to an arc discharge, in which the discharge is localized to cause intense light and a heat of about a few thousand degrees. Accordingly, there are problems that, once the arc discharge occurs, volume of plasma to be generated decreases by the localization of plasma; and a generation region and a reaction region of plasma, radicals and the like are reduced. Then, consequently, efficiency of plasma treatment would be diminished; and an object to be treated using the plasma (for example, an object to be sterilized when the purpose is a sterilization treatment) would be damaged by the high temperature.

The present invention has been made to resolve the above problems and an objective of the present invention is to provide a plasma generation device capable of stably generating atmospheric discharge plasma suppressing an arc discharge that is a discharge being spatially localized, with a generation efficiency higher than that of a conventional method.

In an aspect of a plasma generation device to be disclosed in the present application, the plasma generation device is arranged with a plurality of electrodes facing each other, that includes a discharge position control unit, which is arranged between each of the plurality of electrodes, and is formed by containing an inverse characteristic material composed of a fluid having polarizability and a property that dielectric constant decreases with an increase in temperature, in a container formed of a dielectric material; wherein the inverse characteristic material is spaced apart from each of the plurality of electrodes. As described above, according to the plasma generation device to be disclosed in this application, the discharge position control unit formed of the inverse characteristic material in which the dielectric constant decreases with the increase in temperature is provided, and the inverse characteristic material is spaced apart from each of the plurality of electrodes. Therefore, the dielectric constant in a region in the vicinity of an electrode where plasma has been generated decreases due to the increase in temperature, and discharge is suppressed in the region; while the plasma is induced into an adjacent region (a region where plasma has not yet been generated) having a dielectric constant higher than that of the present region. Accordingly, the discharge position would sequentially move to other regions, thereby allowing spatially non-localized plasma, in which an arc discharge is suppressed, to be generated.

And, in another aspect of the plasma generation device to be disclosed in the present application, depending on the needs, the discharge position control unit may be formed by containing an inverse characteristic material composed of a fluid having polarizability, in a container formed of a dielectric material. As described above, according to the plasma generation device to be disclosed in this application, the discharge position control unit may be formed by containing the inverse characteristic material having polarizability, in the container formed of the dielectric material. Therefore, the container can be formed into a complicated shape. Further, the fluid having polarizability has a high dielectric constant particularly compared to other substances, and the rate of increase in temperature accompanying the application of an AC electric field is high. Accordingly, the dielectric constant would sharply decrease with the increase in temperature in a region where the plasma has been generated, thereby allowing spatially non-biased plasma, in which an arc discharge is suppressed, to be generated. As for the polarizability, an electric dipole moment [unit: debye (D), D=$3.33564\times10^{-30}$ C·m] possessed by the inverse characteristic material may be used as an indicator. When the electric dipole moment is larger than 0 D, it is indicated to possess a polarizability.

Also, in another aspect of the plasma generation device to be disclosed in the present application, depending on the needs, thermal conductivity of the fluid may be no more than 4 W/(m·K). As described above, according to the plasma generation device to be disclosed in this application, the thermal conductivity of the fluid is relatively low that may be no more than 4 W/(m·K). Therefore, the increase in temperature in a region in the fluid where plasma has been generated becomes further localized, and a temperature distribution having a remarkable temperature difference emerges. Accordingly, the discharge position becomes more likely to move to other regions, thereby allowing spatially non-biased plasma, in which an arc discharge is further suppressed, to be generated.

Then, in another aspect of the plasma generation device to be disclosed in the present application, depending on the needs, the discharge position control unit may include a partitioned area arranged to plurally partition the inverse characteristic material facing one of the plurality of electrodes. As described above, according to the plasma generation device to be disclosed in this application, the partitioned area arranged along the direction facing one of the plurality of electrodes may be provided. Therefore, in the inverse characteristic material, an increase in temperature due to the plasma generation occurs partition by partition, in the partitioned area, and the increase in temperature becomes more localized, and then the temperature distribution having the remarkable temperature difference emerges. Accordingly, the discharge position becomes more likely to move to an adjacent partitioned region, thereby allowing spatially non-biased plasma, in which an arc discharge is further suppressed, to be generated. And, due to the presence of the partitioned area, when the inverse characteristic material is a fluid, convection which lessens the temperature difference in the fluid would be suppressed; on the other hand, when the inverse characteristic material is a solid, the temperature distribution would be facilitated in the solid by the temperature insulation in the solid. Thus, in both cases, the temperature distribution in the inverse characteristic material can be generated reliably by the plasma generation, and a variety of available inverse characteristic materials can be widened. For example, when each of the plurality of electrodes has a planar shape, the partitioned area is set in the perpendicular direction to the electrode surface of each of the plurality of electrodes, and is arranged in a horizontal direction along the electrode surface, thereby allowing the inverse characteristic material to be plurally partitioned.

Further, in another aspect of the plasma generation device to be disclosed in the present application, depending on the needs, one electrode of the plurality of electrodes may be formed of a linear shaped conductor; the discharge position control unit formed in a cylindrical shape may be arranged along an outer circumference in an axial direction of said one electrode through a plasma generating area formed of a gap; another electrode of the plurality of electrodes may be arranged around the outer circumference of the discharge position control unit; and a plasma generating gas may be supplied into the plasma generating area to generate plasma. As described above, according to the plasma generation device to be disclosed in this application, the discharge position control unit may be formed in a cylindrical shape. Therefore, radial plasma would be generated not only in an axial direction but also on a plane perpendicular to the axial direction of the cylindrical shape, thereby allowing three-dimensionally non-biased plasma to be generated.

Furthermore, in another aspect of the plasma generation device to be disclosed in the present application, depending on the needs, the plurality of electrodes may be arranged along an outer periphery of the discharge position control unit at equal intervals; and the discharge position control unit may include a treatment space, in the inside of which a plasma treatment object is stored. As described above, according to the plasma generation device to be disclosed in this application, the plurality of electrodes may be arranged along the outer periphery of the discharge position control unit at equal intervals; and the discharge position control unit may include the treatment space, in the inside of which the plasma treatment object is stored. Therefore, the plasma would be generated so as to three-dimensionally surround the treatment space which is formed by being surrounded around by the plurality of electrodes. Accordingly, the plasma treatment can be efficiency carried out on the plasma treatment object by the three-dimensionally non-biased plasma generated in the treatment space.

Still further, in another aspect of the plasma generation device to be disclosed in the present application, depending on the needs, the plurality of electrodes may be respectively connected with power supplies; and the power supplies may be controlled so that each phase difference between the mutual adjacent power supplies is respectively different by an equal interval so as to be a total of 360° phase difference. As described above, according to the plasma generation device to be disclosed in this application, the plurality of electrodes may be respectively connected with the power supplies; and the power supplies may be controlled so that each phase difference between the mutual adjacent power supplies is respectively different by an equal interval so as to be a total of 360° phase difference. Therefore, the discharge would be constantly and cyclically generated between the respective electrodes. Accordingly, the discharge would uniformly surround the treatment space also over time, and the plasma would be three-dimensionally generated also in a direction piercing through the direction facing across the treatment space, thereby allowing the plasma treatment to be carried out efficiently on a plasma treatment object.

DETAILED DESCRIPTION

First Embodiment

Hereinafter, a plasma generation device according to a First Embodiment will be described based on FIG. 1 and FIG. 2.

Figure 1:
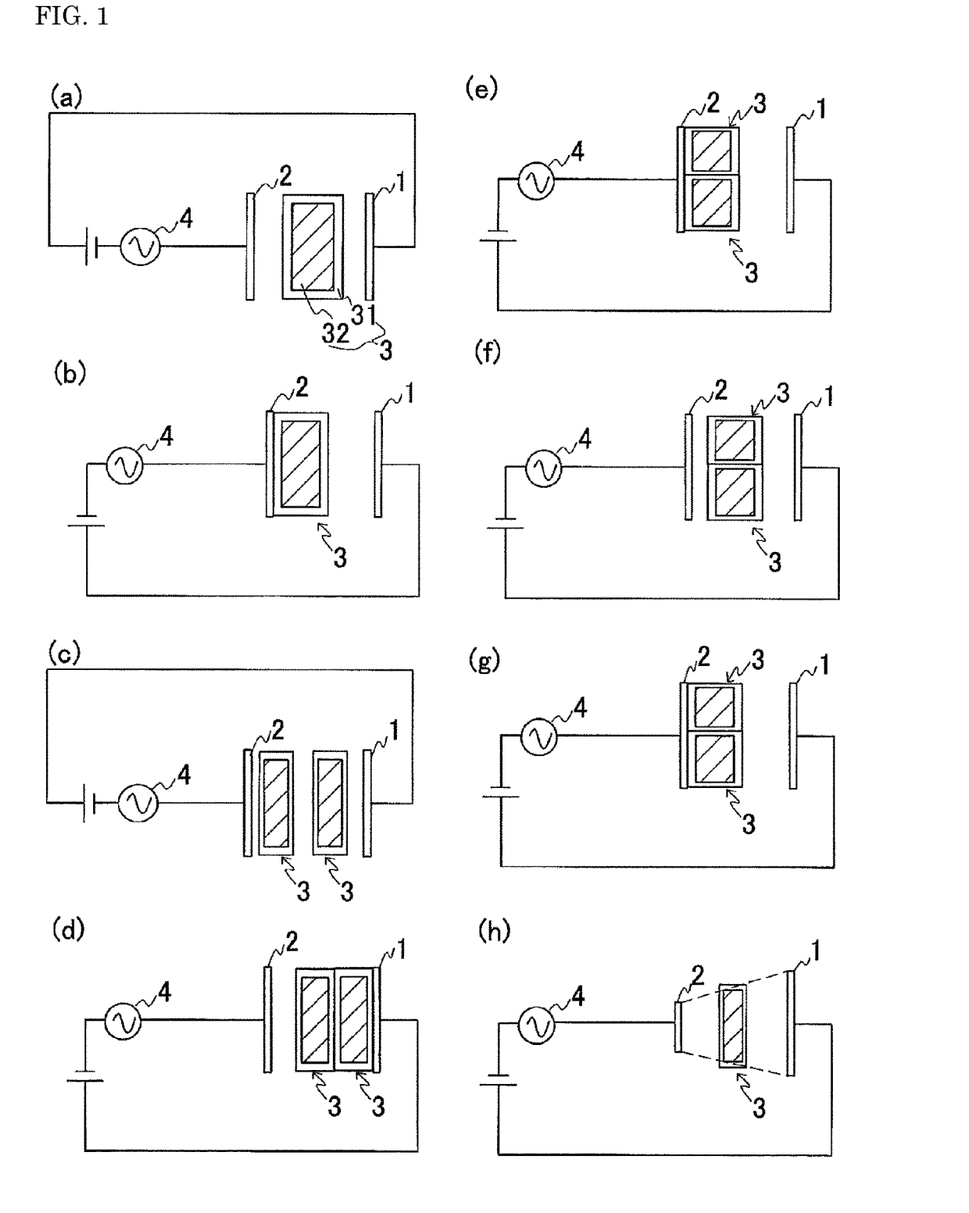
FIG. 1 shows configuration diagrams of a plasma generation device according to a First Embodiment of the present invention.
Figure 2:
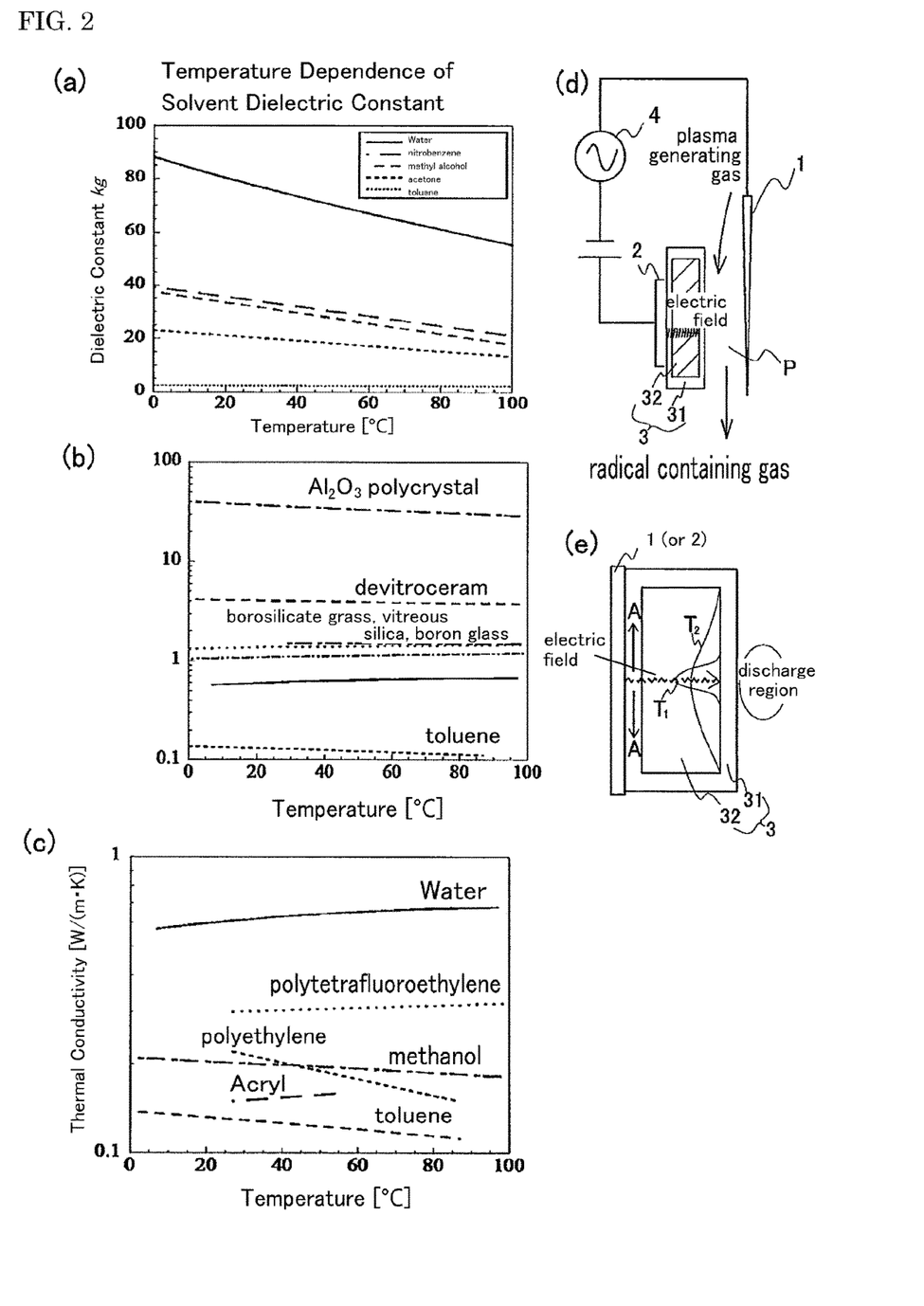
FIG. 2 shows temperature property charts of dielectric constant and thermal conductivity of an inverse characteristic material in the plasma generation device according to the First Embodiment of the present invention, and configuration diagrams of the plasma generation device according to the First Embodiment of the present invention.

FIG. 1 shows configuration diagrams of the plasma generation device, and explanatory diagrams illustrating generation of plasma according to the First Embodiment of the present invention; and FIG. 2 shows temperature property charts of dielectric constant and thermal conductivity of an inverse characteristic material in the plasma generation device of FIG. 1, and configuration diagrams of the plasma generation device according to the First Embodiment of the present invention.

In FIG. 1(a), the plasma generation device according to the Embodiment has a configuration that includes: a counter electrode 1; a contact electrode 2 arranged with facing the counter electrode 1; a dielectric container 31 formed of a dielectric material interjacent between the plurality of electrodes serving as the counter electrode 1 and the contact electrode 2; a discharge position control unit 3 arranged in the dielectric container 31, and formed of an inverse characteristic material 32 in which dielectric constant decreases with an increase in temperature; and an AC power supply 4 configured to apply alternating-current or pulsed voltage to between electrodes of the counter electrode 1 and the contact electrode 2.

An electrode such as a metal electrode or an insulation film coated metal electrode may be used for the counter electrode 1 and the contact electrode 2. And, a metal such as platinum, aurum, or palladium may be used for the metal electrode, and platinum is desirable for ease of handling. The dielectric container 31 is not particularly limited as long as it is a solid having a property of a dielectric material, and for example, borosilicate glass or titanium silicate glass may be used.

The discharge position control unit 3 is formed of an inverse characteristic material 32. The inverse characteristic material 32 is a substance having an inverse characteristic (a property that the dielectric constant decreases with an increase in temperature). Due to the configuration according to the Embodiment that the inverse characteristic material 32 is spaced apart from each of the counter electrode 1 and the contact electrode 2 (each of the plurality of electrodes), the inverse characteristic material 32 would not be affected by the increase in temperature occurring in the respective electrodes at the time of discharge. Accordingly, in the inverse characteristic material 32, only a region where the discharge has occurred becomes a high temperature region. That is, since the high temperature region would be localized in a temperature distribution emerging in the inverse characteristic material 32 at the time of the discharge, the dielectric constant in the region where the discharge has occurred in the inverse characteristic material 32 decreases due to the above-described inverse characteristic, and then any further discharge becomes unlikely to occur in the region where the discharge has occurred, compared to other regions. As a result, the discharge position would sequentially move sharply to other regions as time passes, and spatially non-localized plasma would be generated, thereby reliably allowing for suppression of arc discharge.

The discharge position control unit 3 formed by containing the inverse characteristic material 32 in the dielectric container 31 may be arranged, as shown in FIG. 1(a), between the counter electrode 1 and the contact electrode 2. Then, the discharge position control unit 3 may be configured so as to contact neither the counter electrode 1 nor the contact electrode 2. And, as shown in FIG. 1(b), the discharge position control unit 3 may also be arranged so as to contact the contact electrode 2, or may also be arranged so as to contact the counter electrode 1.

And, as for the dielectric container 31, which constitutes the discharge position control unit 3, as shown in FIGS. 1(c) and (d), a plurality of dielectric containers 31 may be arranged in the facing direction of the respective electrodes, and also, as shown in FIGS. 1(e) and (f), a plurality of dielectric containers 31 may be arranged in a direction perpendicular to the facing direction of the respective electrodes. As described above, in the discharge position control unit 3, the number and the positional relationship of the dielectric containers 31 are not particularly limited. Also, when a plurality of dielectric containers 31 are arranged, the inverse characteristic materials 32 to be contained in the dielectric containers 31 may be the same type, or may also be different types.

In this regard, as for the discharge position control unit 3, almost all over the region of a discharge region emerging between the respective electrodes of the counter electrode 1 and the contact electrode 2, is preferably shielded. Due to such a configuration, the discharge position control unit 3 would firmly cover the discharge region, and therefore the temperature distribution of the inverse characteristic material 32, which constitutes the discharge position control unit 3, would be formed all over the discharge region exhaustively. Accordingly, non-localizing plasma is generated as a consequence, thereby reliably allowing for suppression of arc discharge.

Similarly to the above case, as shown in FIG. 1(h), almost all over the region of the discharge region (the region surrounded by the dashed line and facing surfaces of the respective electrodes in the figure) emerging between the respective electrodes is preferably shielded also when the facing surfaces of the respective electrodes of the counter electrode 1 and the contact electrode 2 are different in size from each other (FIG. 1(h) shows a case, as one such example, where the size of the facing surface of the counter electrode 1 is larger than that of the contact electrode 2).

As for the inverse characteristic material 32, in addition to a solid having an inverse characteristic (a property that the dielectric constant decreases with an increase in temperature), it is preferably a liquid (including a form of sol and a form of gel) having a high (remarkable) inverse characteristic (the property that the dielectric constant decreases with the increase in temperature). As shown in FIG. 2(a), examples of such a liquid include: water, nitrobenzene, methyl alcohol (methanol), toluene, and acetone, those have an excellent temperature dependence property in solvent dielectric constant. Their respective electric dipole moment (serving as an indicator of polarizability) [unit: debye (D)] values are: water (1.85 D), nitrobenzene (4.22 D), methyl alcohol (1.69 D), acetone (2.88 D), and toluene (0.36 D). It is preferably a material having an electric dipole moment of larger than 0.36 D, such as water, nitrobenzene, methyl alcohol (methanol), or acetone; and particularly preferably water having the highest electric dipole moment. And, as shown in FIGS. 2(b) and (c), it is preferably a liquid having a relatively low thermal conductivity of no more than 4 W/(m·K), and particularly preferably water also for ease of handling. As for the thermal conductivity, when the thermal conductivity is larger than 4 W/(m·K), temperature gradient in the temperature distribution cannot be obtained sufficiently, and then movement of discharge becomes unlikely to occur.

Hereinafter, specific plasma generation according to the Embodiment will be described based on the above-described configurations.

In the Embodiment, as shown in FIG. 2(d), water serving as an example of the inverse characteristic material 32, and the dielectric container 31 configured to contain the water are disposed between the electrodes of the counter electrode 1 and the contact electrode 2, as the discharge position control unit 3. A discharge gas such as air, argon, helium, nitrogen, and oxygen, is let flow into in-between the electrodes, and AC voltage is applied from an AC power supply 4 to between the electrodes. By the application of voltage, plasma P is generated with discharge between the electrodes. And particularly, when air and oxygen are used for the discharge gas, ozone and an oxygen radical are generated.

Since the plasma generation device according to the Embodiment is provided with the discharge position control unit 3 formed of the inverse characteristic material 32, in which the dielectric constant decreases with the increase in temperature, a temperature distribution $T_1$ is formed in the inside of the discharge position control unit 3, as shown in FIG. 2(e), at the time when a discharge occurs from the counter electrode 1 or the contact electrode 2. Although the mechanism of forming such a temperature distribution $T_1$ has not yet been elucidated in detail, it can be inferred based on the functions to be described below. First, by applying AC voltage to between the counter electrode 1 and the contact electrode 2, molecules in the inverse characteristic material 32 that received the AC voltage vibrate in accordance with an inherent polarizability of the individual molecules. As a result of the vibration of the molecules, heat would be locally caused in the inverse characteristic material 32, and then a temperature distribution $T_1$, in which a region most strongly affected by an AC electric field becomes the highest temperature, emerges. In order to obtain a significant temperature distribution $T_1$, the inverse characteristic material 32 preferably has a polarizability, more preferably has a high polarizability. In other words, the inverse characteristic material 32 is preferably composed of a molecule having a high electric dipole moment, and particularly preferably a molecule having an electric dipole moment of higher than 0.36 D.

When the temperature distribution $T_1$ is formed in the inside region of the discharge position control unit 3, the dielectric constant would decrease in the inside region of the discharge position control unit 3 nearer to a localized region where a discharge has occurred, due to the property of the inverse characteristic material 32 that the dielectric constant decreases with the increase in temperature. Consequently, discharge is suppressed in the localized region where a discharge has previously occurred, while discharge is facilitated in surrounding adjacent regions where the dielectric constant is high, and then the discharge region would move in the directions indicated by arrows A in the figure. Due to the movement of the discharge region in the directions indicated by arrows A, a temperature distribution $T_2$ having a gradient flatter than that of the temperature distribution $T_1$ is formed in the discharge position control unit 3, and the discharge region is to be spreading thereafter so as to become a temperature distribution having more flatter gradient. As described above, since the discharge position sequentially moves, such a discharge, occurring intensively at one point, would be eliminated, thereby suppressing the increase in temperature caused by the intensive discharge. Thus, the increase in temperature in the inverse characteristic material would be also suppressed.

Meanwhile, in an electrode configuration of a conventional plasma generation device, there is a configuration in which an electrode is immersed in a liquid (Patent Document 3 previously described). However, in the configuration, a high-temperature region is not localized in the temperature distribution emerged accompanying discharge, in the liquid, and the distribution is to spread all over the liquid homogeneously and smoothly. Therefore, the above device is different from the plasma generation device according to the Embodiment, not only on the electrode configuration but also on the functions. As for a reason, since an electrode is generally a conductor, it has an electrically conductive property. Additionally, it also has a thermally conductive property. Therefore, the electrode has also a characteristic of high in thermal conductivity, that is, a property as a thermal conductor. Accordingly, in the conventional plasma generation device, the temperature distribution emerges in the liquid at the time of discharge due to a thermal energy caused by the discharge, and movement of the thermal energy also occurs through an electrode having a high thermal conductivity. In contrast to the plasma generation device according to the Embodiment in which the high-temperature region is localized, the above-described high-temperature region is not localized in the temperature distribution emerged accompanying discharge, in the liquid, and the distribution is to be spreading all over the liquid homogeneously and smoothly.

As described above, by emergence of the temperature distribution and the decrease of the dielectric constant according to the temperature distribution in the inside of the discharge position control unit 3, discharge in the region where plasma has been generated with the localized discharge is suppressed, while discharge is facilitated in adjacent regions (a region where plasma has not yet been generated, or a region where a plasma density is low) where the dielectric constant is higher than that of the region where the localized discharge has previously occurred. Accordingly, the discharge position would sequentially move to other regions, thereby allowing spatially non-biased plasma, in which a localized arc discharge is suppressed, to be generated. Further, a dielectric container and a cooling unit for cooling the respective electrodes may be disposed. For example, by cooling the inverse characteristic material 32 with the cooling unit, forming of a significant temperature distribution would be facilitated, and the discharge position can be accurately moved by the discharge position control unit 3. The cooling operation may be carried out while once stopping the discharge, or may also be carried out during the discharge. Since plasma obtained in the manner described above is a plasma having a high stability, that is capable of being applied in a wide range of fields including sterilization and inactivation of bacteria and mold, and toxins produced by them, on the surface of food, and also disinfection, bacterial killing, antisepsis, gas decomposition, material surface plasma-modification, and more.

Second Embodiment

Figure 3:
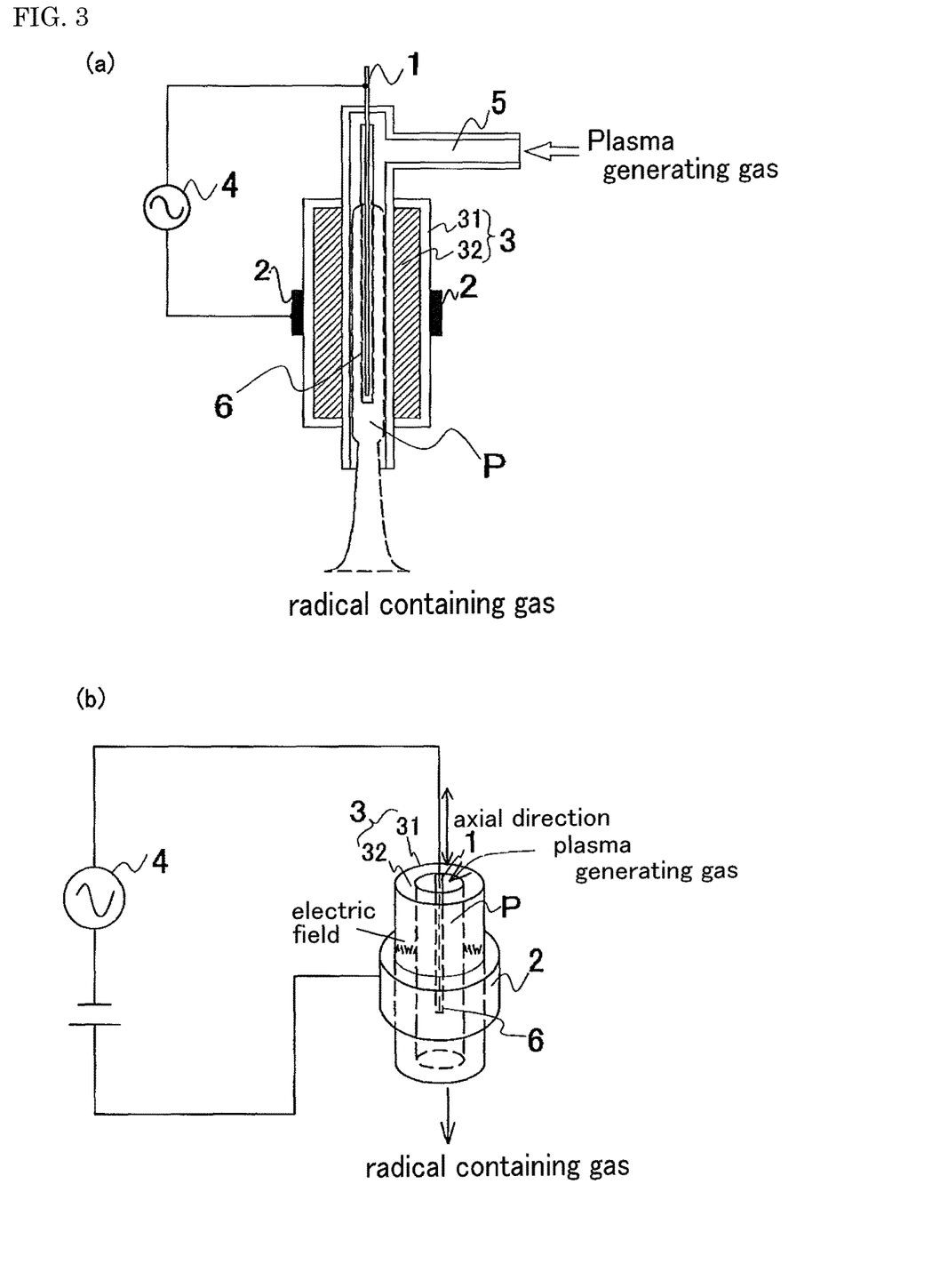
FIG. 3 shows a configuration diagram of the plasma generation device, and an explanatory diagram illustrating plasma generation according to a Second Embodiment of the present invention.

Hereinafter, the plasma generation device according to a Second Embodiment will be described based on FIG. 3. FIG. 3 shows a configuration diagram of the plasma generation device, and an explanatory diagram illustrating plasma generation according to the Second Embodiment of the present invention.

In FIG. 3, the plasma generation device according to the Embodiment is a modified mode of the plasma generation device shown in FIG. 1, and is defined to have a configuration that the counter electrode 1 and the AC power supply 4 similar to those in the First Embodiment are provided; and the contact electrode 2, the dielectric container 31, and the discharge position control unit 3 have a circular cylindrical shape. Further, as shown in FIG. 3(a), a gas flow path 5 configured to let a discharge gas flow into the vicinity of the counter electrode 1 is provided.

The plasma generation device according to the Embodiment is defined that, as shown in FIG. 3(b), the contact electrode 2, the dielectric container 31, and the discharge position control unit 3 have a circular cylindrical shape; and the counter electrode 1 is formed of a linear shaped conductor; the discharge position control unit 3 formed in a cylindrical shape is arranged along the outer circumference in an axial direction of the counter electrode 1 through a plasma generating area formed of a gap; the contact electrode 2 is arranged around the outer circumference of the discharge position control unit 3; and the discharge gas is supplied into the plasma generating area to generate plasma.

For the contact electrode 2 shown in FIG. 3, a shape such as a dot, a straight line, or a plane may be used. However, when a shape of a dot or straight line is used, an electric field is concentrated at the outside region of the dielectric container 31, and unnecessary discharge is likely to occur. Therefore, a plane shape is preferably used. The dielectric container 31 may partially have a conductivity. The discharge position control unit 3 is formed, as shown in FIG. 3(b), in a cylindrical shape arranged along the outer circumference in an axial direction of the counter electrode 1 through a plasma generating area formed of a gap. And, the surface of the counter electrode 1 may be coated with an insulation film coating 6 formed of an insulation film, according to usage.

Hereinafter, specific plasma generation according to the Embodiment will be described based on the above-described configuration.

In the Embodiment, water, which is an example of the inverse characteristic material 32, and the dielectric container 31 to contain the water are disposed between the electrodes of the counter electrode 1 and the contact electrode 2, as the discharge position control unit 3. A discharge gas such as air, argon, helium, nitrogen, and oxygen is let flow into the vicinity of the counter electrode 1 via the gas flow path 5, and AC voltage is applied from the AC power supply 4 to between the electrodes. By the application of voltage, plasma P is generated with the discharge between the electrodes. And particularly, when air and oxygen are used for a discharge gas, ozone and an oxygen radical is generated.

As described above, in the plasma generation device according to the Embodiment, since the discharge position control unit 3 is formed in a cylindrical shape, radial plasma would be generated not only in an axial direction but also with respect to a plane perpendicular to the axial direction of the cylindrical shape, thereby allowing three-dimensionally non-biased plasma to be stably generated.

Third Embodiment

Figure 4:
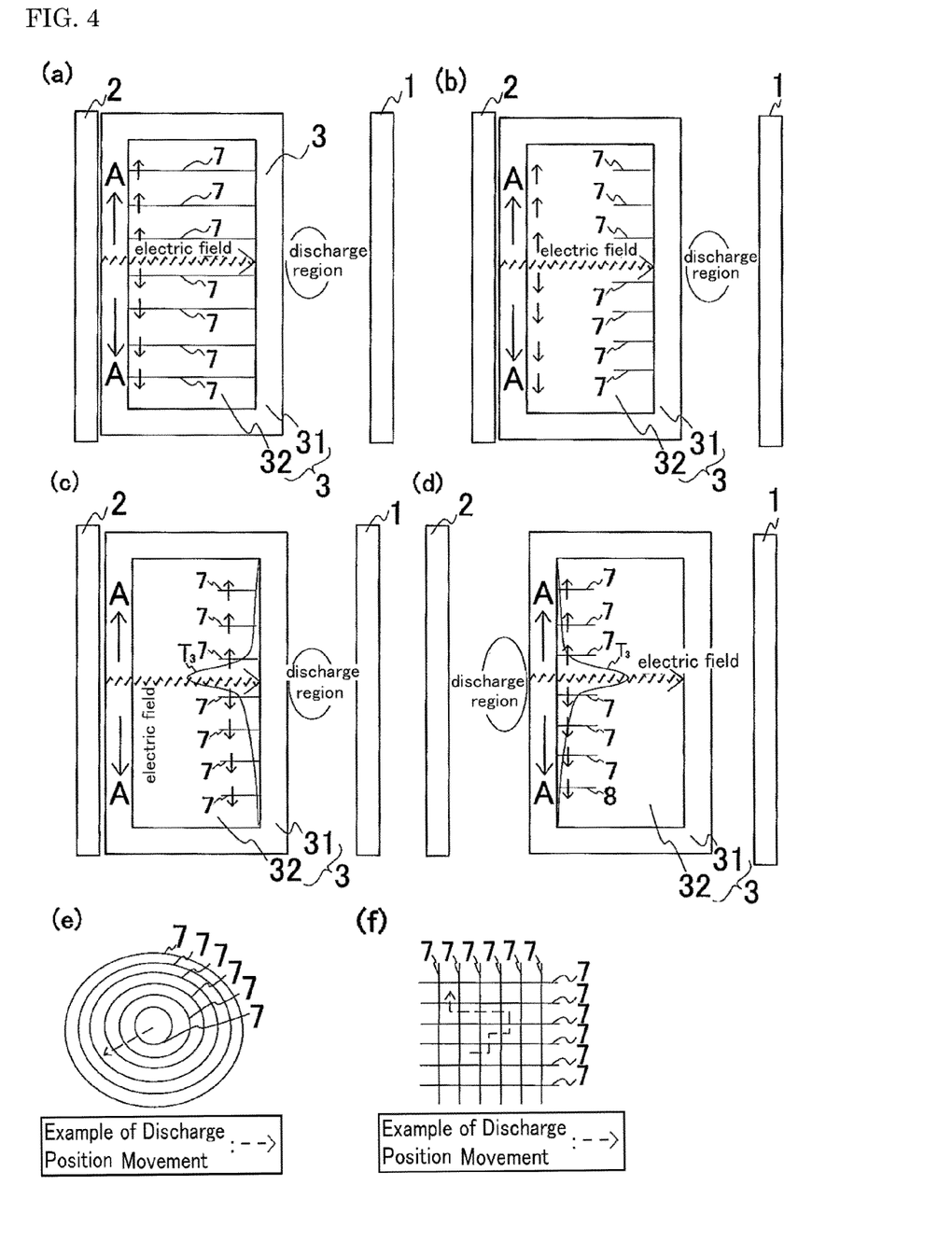
FIG. 4 shows explanatory diagrams illustrating configurations of the plasma generation device according to a Third Embodiment of the present invention.

FIG. 4 shows explanatory diagrams illustrating configurations of the plasma generation device according to a Third Embodiment of the present invention. In the plasma generation device of the above Embodiment, the discharge position control unit may be provided with a partitioned area 7 configured to plurally partition the inverse characteristic material 32 facing any one of the plurality of electrodes. As the partitioned area 7, a plane plate formed of a resin such as a plastic may be used. The partitioned area 7 is formed, as shown in FIG. 4(a), so that their respective end portions are in close contact with a wall surface on the side nearer to a discharge region (an opposite side to the contact electrode 2) in the discharge position control unit 3, when the dielectric container 31 is arranged, as shown in the previously-presented FIG. 1(b), so as to be in contact with the contact electrode 2, as shown in FIG. 4(a), and an electric field (shown by arrows in the figure) emanates from the contact electrode 2. As shown in FIG. 4(a), by forming the partitioned area 7 to be in close contact with the wall surface where an intensity of the electric field emanated in the discharge position control unit 3 at the time of a localized discharge is the largest, the partitioned area 7 would partition a discharge starting point with closely contacting a discharge starting surface. Accordingly, the increase in temperature occurring accompanying the discharge in the inverse characteristic material 32 can be generated more locally, thereby allowing a temperature distribution having more remarkable temperature gradient to be obtained.

The partitioned area 7 may be disposed so that whole the inverse characteristic material 32 is partitioned so as to be divided into each individual section, or may also be disposed, as shown in FIG. 4(b), only in the vicinity of a wall surface on the side nearer to the discharge region (an opposite side to the contact electrode 2) in the discharge position control unit 3. Even when the partitioned area 7 is disposed only in the vicinity of the wall surface on the side nearer to the discharge region (the opposite side to the contact electrode 2) in the discharge position control unit 3, as shown in FIG. 4(c), formation of a temperature distribution $T_3$ having a temperature gradient similar to the previously-presented FIG. 2(d) can be facilitated due to the partitioned area 7. Also, even when the dielectric container 31 is arranged, as shown in the previously-presented FIG. 1(b), between the counter electrode 1 and the contact electrode 2, as shown in FIG. 4(d), by forming the end portion of the partitioned area 7 to be in close contact with the wall surface on the side nearer to the discharge region (a side nearer to the contact electrode 2) in the discharge position control unit 3, the partitioned area 7 can facilitate formation of the temperature distribution $T_3$ similarly to the above.

As for the shape of the partitioned area 7, in addition to the above shapes, such as a concentric shape, a matrix shape, or a reed-like shape can be applied. For example, as shown in FIG. 4(e), when the partitioned area 7 is formed into a concentric shape, a temperature distribution is to be formed so that temperature is different with respect to each region surrounded by each adjacent concentric circle. After the first discharge, the discharge position would sequentially move region by region. Or, for example, as shown in FIG. 4(f), when the partitioned area 7 is formed into a matrix shape, the discharge position would sequentially move grid-section by grid-section, which constitutes the matrix. Even when no partitioned area 7 is provided, a sequential temperature distribution is spontaneously formed in the inverse characteristic material; on the other hand, when the partitioned area 7 is provided, a temperature distribution is formed with respect to each region partitioned by the partitioned area 7. As described above, by providing the partitioned area 7, the temperature distribution can be formed forcibly. Therefore, even when a sufficient temperature distribution is difficult to be obtained by the inverse characteristic material alone, a significant temperature distribution can be obtained reliably, thereby allowing a variety of available inverse characteristic materials to be widened.

As described above, since by providing the partitioned area 7, the increase in temperature caused by the plasma generation occurs partition by partition, in the inverse characteristic material 32, the increase in temperature becomes more localized. And then a temperature distribution having a remarkable temperature difference is generated, and the discharge position becomes more likely to move to an adjacent partitioned region, thereby allowing spatially non-biased plasma, in which an arc discharge is suppressed, to be generated. And, due to the presence of the partitioned area 7, when the inverse characteristic material 32 is a fluid (such as a liquid including a form of solid and a form of gel), convection which lessens temperature difference in the fluid would be suppressed; on the other hand, when the inverse characteristic material 32 is a solid, the temperature distribution would be facilitated in the solid by temperature insulation in the solid. Thus, in both cases, the temperature distribution in the inverse characteristic material 32 can be generated reliably by the plasma generation, and a variety of available inverse characteristic materials 32 can be widened.

Fourth Embodiment

Figure 5:
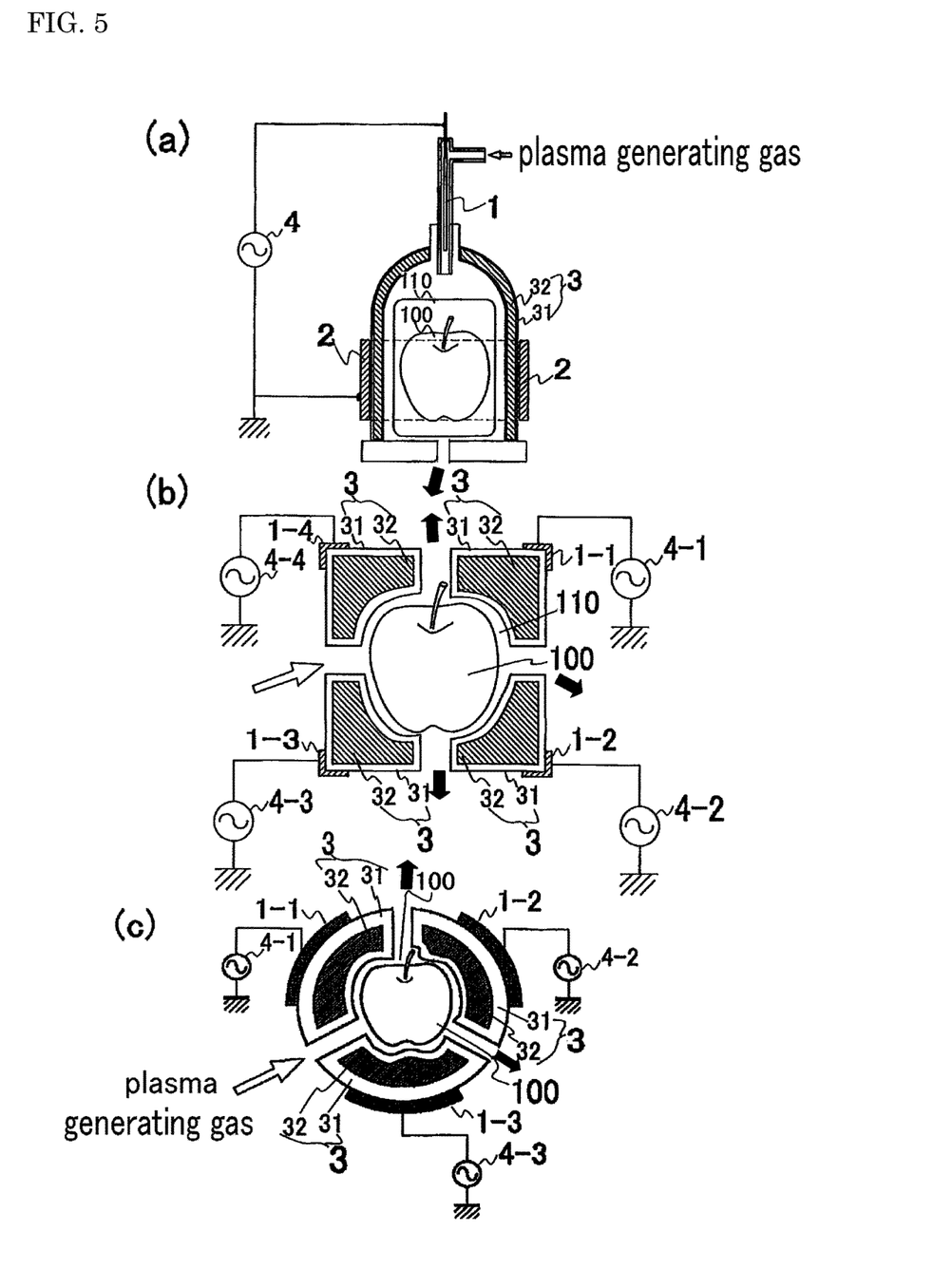
FIG. 5 shows explanatory diagrams illustrating configurations of the plasma generation device according to a Fourth and Other Embodiments of the present invention.

FIG. 5(a) shows an explanatory diagram illustrating a configuration of the plasma generation device according to a Fourth Embodiment of the present invention. In FIG. 5(a), the plasma generation device according to the Embodiment is a modified mode of the plasma generation device shown FIG. 3(a), and has a configuration that the counter electrode 1 and the AC power supply 4 similar to those in the Second Embodiment are provided; and the contact electrode 2, the dielectric container 31, and the discharge position control unit 3 have a circular cylindrical shape; a discharge gas (plasma generating gas) is let flow into (outlined arrow) the vicinity of the counter electrode 1; and the discharge gas (plasma generating gas) is let out (black arrow) from a bottom portion of a treatment space 110 in which a plasma treatment object 100 is to be stored. The plasma treatment object 100 is placed in the treatment space 110 in the inside of the discharge position control unit 3, and is positioned in the vicinity of the inner side of the contact electrode 2 which surrounds around the discharge position control unit 3. Due to such a configuration, in the treatment space 110 storing the plasma treatment object 100, sterilization would be efficiency carried out by plasma fully filled inside the discharge position control unit 3. In addition, the contact electrode 2 may be divided into a plurality of pieces to be arranged along the outer periphery of the discharge position control unit 3, at equal intervals. In this case, discharge would be sequentially generated with respect to each electrode of the divided contact electrodes 2 at the outer periphery of the counter electrode 1, on the basis of the counter electrode 1. Thus, a cyclic discharge can be generated in the treatment space, in the inside of which the plasma treatment object is stored, thereby allowing the plasma treatment to be carried out efficiently on the plasma treatment object.

Other Embodiments

The present invention is not limited to the Embodiments described above. FIG. 5(b) shows an explanatory diagram illustrating a configuration of the plasma generation device according to Other Embodiments. The plasma generation device according to the Embodiment has a configuration, as shown in FIG. 5(b), that a plurality of electrodes 1-1, 1-2, 1-3, and 1-4 are arranged along the outer periphery of the discharge position control unit 3 at equal intervals; and the discharge position control unit 3 is provided with the treatment space 110, in the inside of which a plasma treatment object 100 is stored. In the configuration, as shown in FIG. 5(b), the discharge gas (plasma generating gas) is let flow in (outlined arrow) through a gap between the electrodes, and is let out (black arrows) through other gaps between other electrodes. In addition, as for the flow of the discharge gas (plasma generating gas), in FIG. 5(b), the gas may be let flow in through between the respective electrodes, and may be let out toward the upper and lower directions with respect to the plane of the paper. For the plurality of electrodes, electric current in which phase difference required for discharge is controlled may be supplied from a single power supply. In this case, due to the control of the phase difference, the discharge can be carried out with sequentially moving the discharge region.

Further, as shown in FIG. 5(b), the plurality of electrodes are respectively connected with power supplies 4-1, 4-2, 4-3, and 4-4, and the power supplies are controlled so that each phase difference between the mutual adjacent power supplies is to be different by an equal interval so as to be a total of 360° phase difference (for example, each phase difference between the respective power supplies is different by 90° in the example of the figure). Each of the power supplies may be arranged so that the phase difference is produced clockwise, or may also be arranged so that the phase difference is produced counterclockwise.

Figure 6:
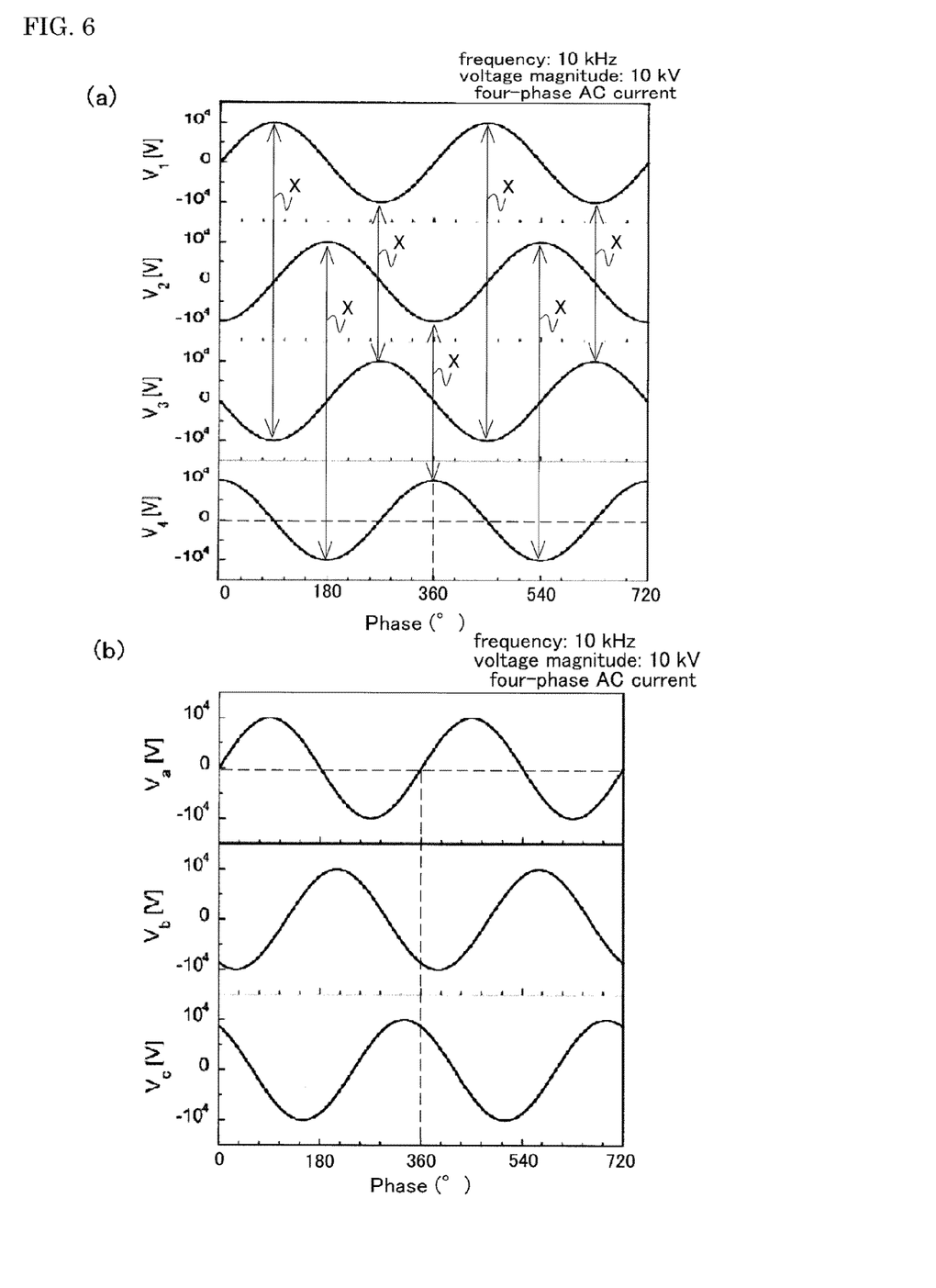
FIG. 6 shows explanatory diagrams illustrating timing charts of AC power supplies of the plasma generation device according to Other Embodiments of the present invention.

FIG. 6(a) shows a timing chart of the AC power supplies in the above case. Each voltage to be applied by the power supplies 4-1, 4-2, 4-3, and 4-4 is respectively denoted by $V_1$, $V_2$, $V_3$, and $V_4$ [V] in FIG. 6(a). Due to the configuration described above, as shown in FIG. 6(a), each interval X indicating occurrence of discharge is constantly and cyclically generated between the electrodes facing across the treatment space 110 as time passes. As described above, since the plurality of electrodes are respectively connected with the power supplies, and the power supplies 4-1, 4-2, 4-3, and 4-4 are controlled so that each phase difference between the mutual adjacent power supplies is controlled to be different by an equal interval so as to be a total of 360° phase difference, discharge would be constantly and cyclically generated between the respective electrodes. Accordingly, the discharge would uniformly surround the treatment space 110 also over time, and the plasma would be three-dimensionally generated also in a direction piercing through the direction facing across the treatment space 110 in which the arc discharge described above would be suppressed, thereby allowing the plasma treatment to be carried out efficiently on the plasma treatment object 100.

In this regard, the number of the plurality of electrodes is set to be four in the above embodiment. However, it is not limited to such an even number of pieces, and it may also be an odd number of pieces. For example, as shown in FIG. 5(c), the plurality of electrodes are an odd number of pieces, that is three here, and they are respectively connected with the power supplies 4-1, 4-2, and 4-3, and the power supplies may be controlled so that each phase difference between the mutual adjacent power supplies is to be different by an equal interval so as to be a total of 360° phase difference (for example, each phase difference between the respective power supplies is different by 120° in the example of the figure). Each of the power supplies may be arranged so that the phase difference is produced clockwise, or may also be arranged so that the phase difference is produced counterclockwise. In the configuration, as shown in FIG. 5(c), the discharge gas (plasma generating gas) is let flow in (outlined arrow) through a gap between the electrodes, and is let out (black arrows) through other gaps between other electrodes. In addition, as for the flow of the discharge gas (plasma generating gas), in FIG. 5(c), the gas may be let flow in through between the respective electrodes, and may be let out toward the upper and lower directions with respect to the plane of the paper.

FIG. 6(b) shows a timing chart of the AC power supplies in the above case. Each voltage to be applied by the power supplies 4-1, 4-2, and 4-3 is respectively denoted by $V_a$, $V_b$, and $V_c$ [V] in FIG. 6(b). Due to the configuration described above, as shown in FIG. 6(b), discharge from each of the plurality of electrodes would be constantly and cyclically generated onto the treatment space 110, and thereby allowing the plasma treatment to be carried out efficiently on the plasma treatment object 100.

In this regard, it is set in the above description that a plurality of discharge position control units 3 are arranged with respect to each of the plurality of electrodes. However, it is not limited to the above arrangement, and the discharge position control unit may also be set as one unit, or may also be set as two units.

Hereinafter, Examples will be described for more specifically showing characteristics of the present invention. However, the present invention is not limited to the following Examples.

Example 1

Figure 7:
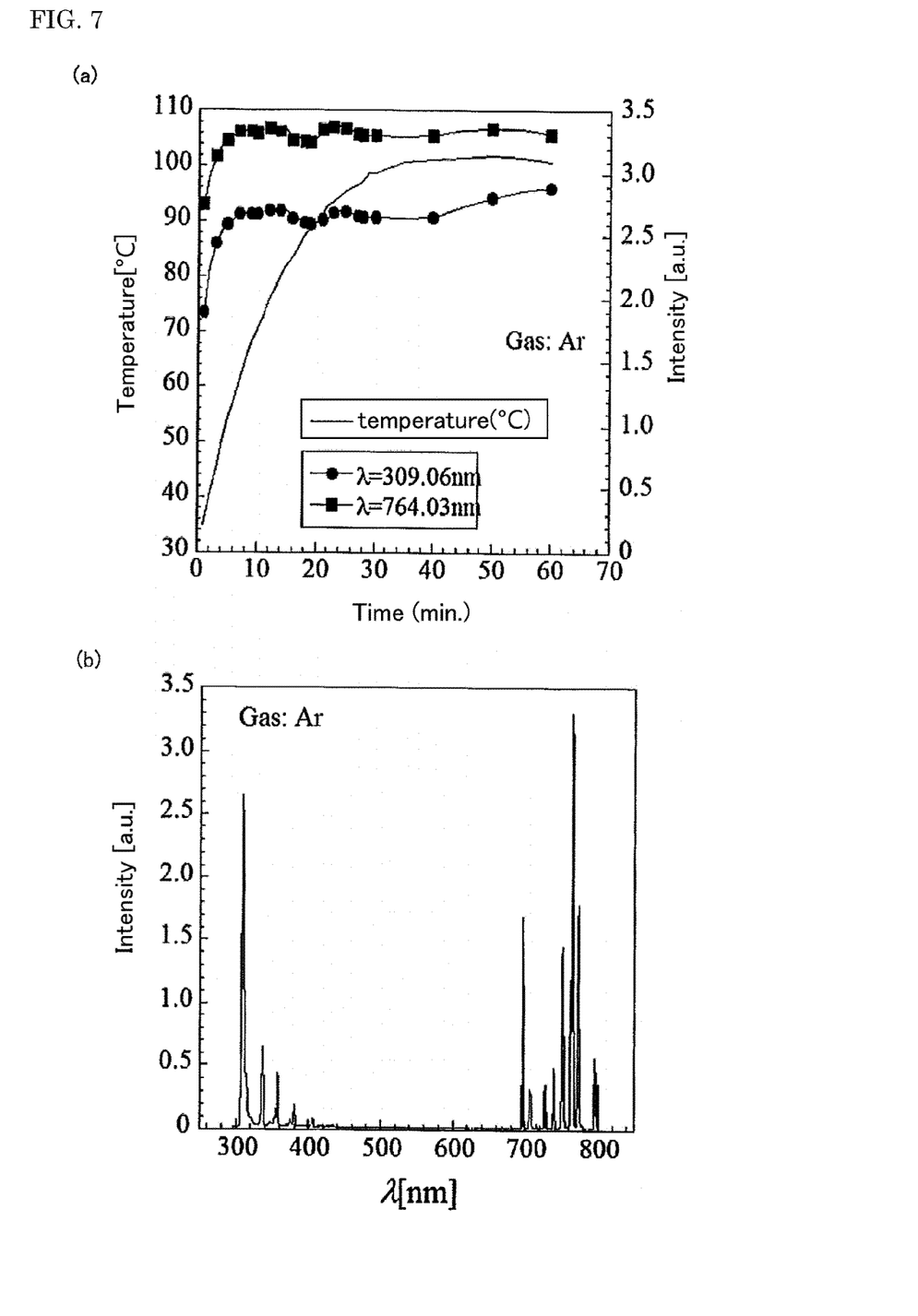
FIG. 7 shows experimental results of time dependence of water temperature (outermost surface of the glass) and emission spectrum, and emission spectrum distribution after a lapse of 30 minutes from the start of a discharge; where the discharge was carried out under an argon atmosphere in the plasma generation device according to the present invention.

Based on the configuration of the Third Embodiment, stability of discharge was confirmed under an argon atmosphere (a thermocouple thermometer <Digital Thermometer IT-2200 and K-type Thermocouple manufactured by AS ONE Corporation>; and a spectrometer <Fastevert S-2431 manufactured by SOMA OPTICS, Ltd>). Water was used as a material having a property that the dielectric constant decreases with an increase in temperature. Two borosilicate glass tubes having different diameters (outside diameter of the inner tube: 6 mm; outside diameter of the outer tube: 18 mm; thickness: 1 mm respectively) were arranged in a coaxial structure similarly to FIG. 3(a) to be used as the dielectric container. A discharge voltage with a frequency of 10 kHz and a voltage magnitude of 4.5 kV was used. Argon was used for the discharge gas. FIG. 7(a) shows experimental results of time dependence of water temperature (outermost surface of the glass) and emission spectrum; and FIG. 7(b) shows experimental results of emission spectrum distribution after a lapse of 30 minutes from the start of the discharge; where the discharge was carried out under an argon atmosphere in the plasma generation device according to the present invention. According to FIG. 7, it is recognized that the temperature of an inverse characteristic material increased accompanying the discharge as time passes when intense peak wavelengths were measured at a wavelength of 309.06 nm and at a wavelength of 764.03 nm; and plasma was generated by the stable discharge without occurrence of an arc discharge.

Example 2

Figure 8:
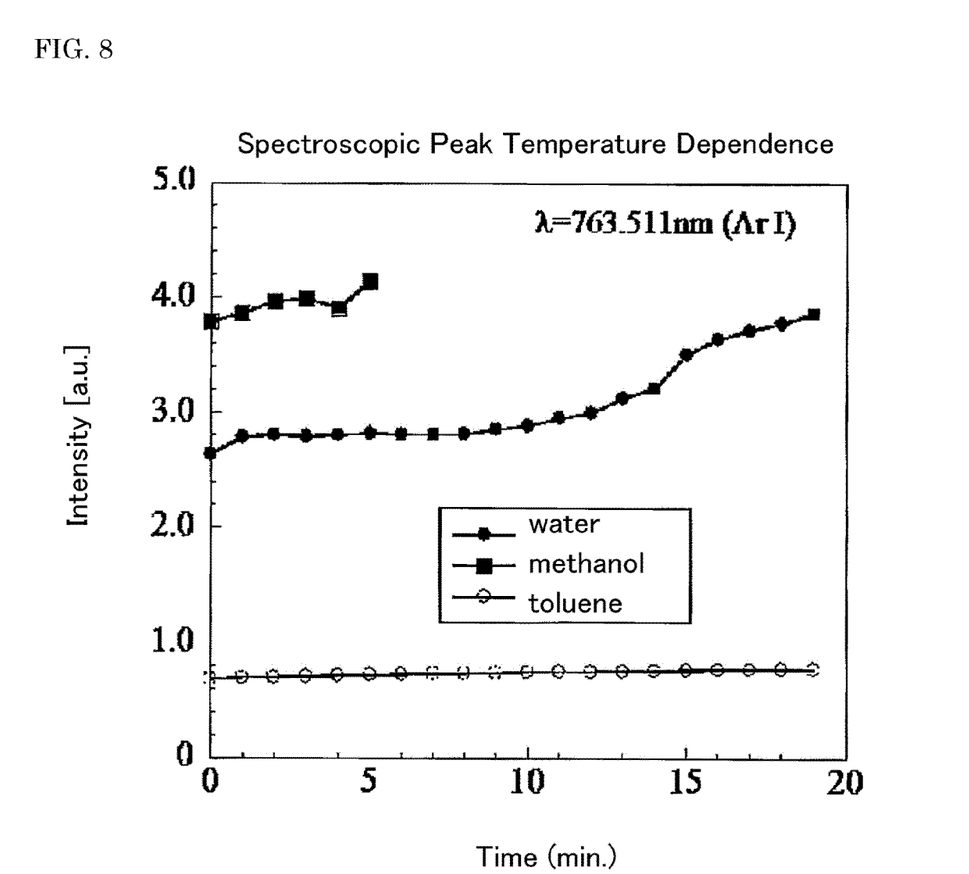
FIG. 8 shows an experimental result of time dependence of peak (wavelength: 763.511 nm) of emission from a discharge unit in the plasma generation device according to the present invention.

FIG. 8 shows an experimental result of time dependence of peak of emission (wavelength: 763.511 nm) from a discharge unit in the plasma generation device according to the present invention (a thermocouple thermometer <Digital Thermometer IT-2200 and K-type Thermocouple manufactured by AS ONE Corporation>; and a spectrometer <Fastevert S-2431 manufactured by SOMA OPTICS, Ltd>). Two borosilicate glass tubes having different diameters (outside diameter of the inner tube: 6 mm; outside diameter of the outer tube: 18 mm; thickness: 1 mm respectively) were arranged in a coaxial structure similarly to FIG. 3(a) to be used as the dielectric container. A discharge voltage with a frequency of 10 kHz and a voltage magnitude of 4.5 kV was used. Argon was used for the discharge gas. According to FIG. 8, it is recognized that even when methanol (dielectric material: purity 99.8%) was used as an inverse characteristic material, discharge occurred similarly to water. When methanol was used, methanol came to a boil in the middle because of its low boiling point, and the experiment finished in five minutes. However, the temperature increased at a quick rate similarly to water, and the discharge became stabilized. In the cases of water and methanol, emission intensity increases as an increase in time (an increase in temperature), spatially non-biased discharge was stably generated due to the average temperature increase of water and methanol. In contrast, when toluene (dielectric material: purity 99.5%), which has a low electric dipole moment, was used as the inverse characteristic material, an increase in temperature was substantially absent, and a stable and dense discharge could not obtained. It is considered that it was because the change in temperature was absent, and therefore a change in the dielectric constant did not occur. As described above, it is recognized that the present invention can be widely applied to any such materials as long as they have a high electric dipole moment, including water.

Example 3

Figure 9:
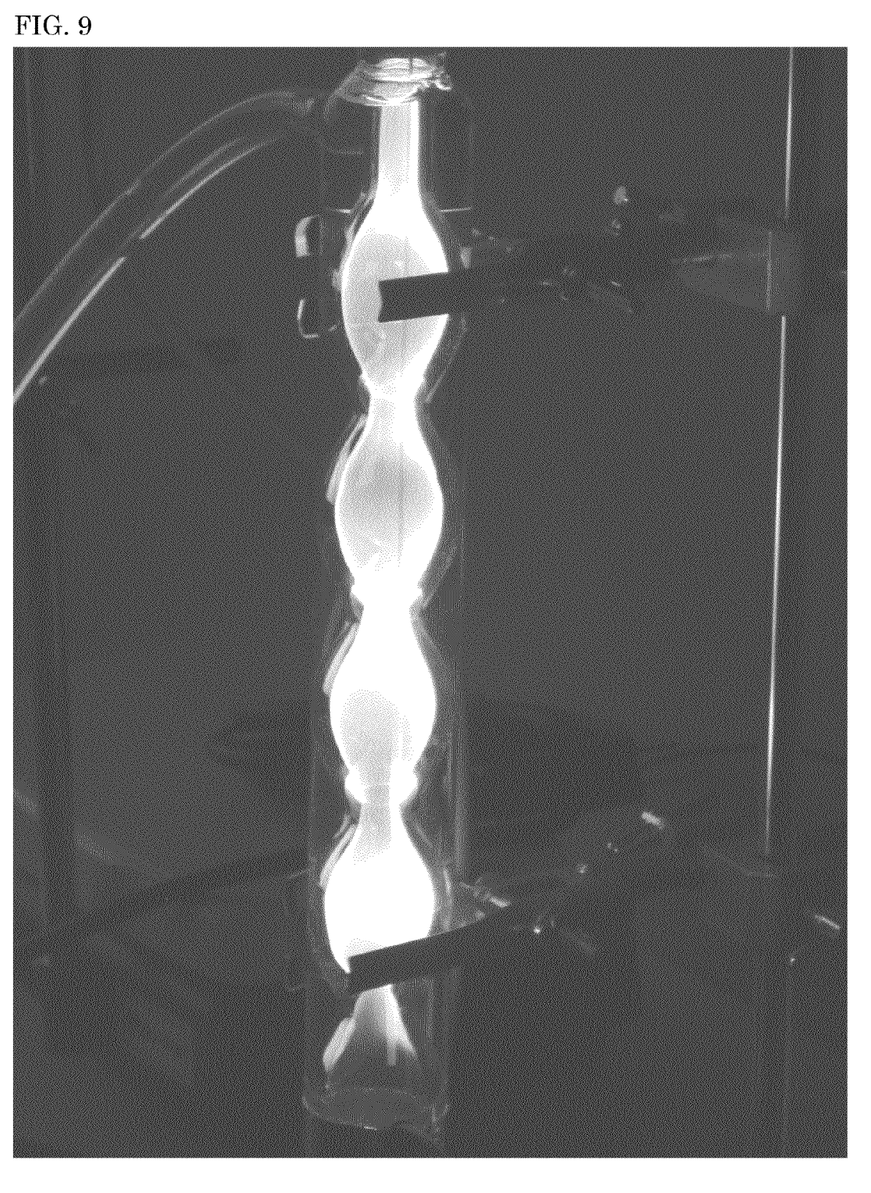
FIG. 9 shows an experimental result when a discharge in the plasma generation device according to the present invention was applied to a large volume of dielectric container having a complicated shape.

FIG. 9 shows an experimental result when discharge in the plasma generation device according to the present invention was applied to a large volume of dielectric container having a complicated shape. An experiment was carried out in an arrangement similar to FIG. 3(a), with the use of a borosilicate glass bulb condenser (Allihn condenser) (length of the inner tube for cooling: 300 mm; outside diameter of the inner tube of the condenser: 11-25 mm) as the dielectric container having a complicated shape, and water filled in the coolant side. A discharge voltage with a frequency of 10 kHz and a voltage magnitude of 4.5 kV was used. The image during the discharge was taken by a digital camera. In typical atmospheric discharge plasma, electric field intensity in the discharge region has a distribution caused by difference in diameter of the inner tube, at positions along an axial direction, and that may cause a spatial bias of plasma. In contrast, regardless of the large variation, 11 mm to 25 mm, in diameter of the inner tube in the present plasma generation device, the discharged plasma did not become a localized discharge such as an arc discharge, due to the effects of the discharge position control unit. And, also regardless of the large discharge region, 300 mm, spatially non-biased stabile plasma was obtained. As described above, it is recognized that the present invention can be widely applied even to the atmospheric discharge plasma using an electrode having a complicated shape and a large discharge region. Particularly, as shown in FIG. 9, when the surface shape of the dielectric container is formed by linkage of spherical surfaces in a beads-like shape, variation in temperature generated in the inverse characteristic material becomes unlikely to be transmitted around, due to the concavo-convex shape on the surface of the dielectric container. Accordingly, there is an advantage that a positive temperature distribution is likely to be formed in the inverse characteristic material at the time of discharge. Further, for example, an object on which plasma is intended to be emitted can be closely confined in a space formed in the inside of the spherical surfaces, thereby allowing the plasma to be emitted efficiently onto the object.

DESCRIPTION OF THE REFERENCE NUMERALS

1 COUNTER ELECTRODE
11 METAL ELECTRODE
2 CONTACT ELECTRODE
3 DISCHARGE POSITION CONTROL UNIT
31 DIELECTRIC CONTAINER
32 INVERSE CHARACTERISTIC MATERIAL
4 AC POWER SUPPLY
5 GAS FLOW PATH
6 INSULATION FILM COATING
7 PARTITIONED AREA
100 PLASMA TREATMENT OBJECT
110 TREATMENT SPACE

What is claimed is:

1. A plasma generation device arranged with a plurality of electrodes facing each other, comprising:
a discharge position control unit, which is arranged between each of the plurality of electrodes, and is formed by containing an inverse characteristic material composed of a fluid having polarizability and a property that dielectric constant decreases with an increase in temperature, in a container formed of a dielectric material;
wherein the inverse characteristic material is spaced apart from each of the plurality of electrodes.

2. The plasma generation device according to claim 1, wherein thermal conductivity of the fluid is no more than 4 W/(m·K).

3. The plasma generation device according to claim 1, wherein the discharge position control unit comprises a partitioned area arranged to plurally partition the inverse characteristic material facing one of the plurality of electrodes.

4. The plasma generation device according to claim 1, wherein:
one electrode of the plurality of electrodes is formed of a linear shaped conductor;
the discharge position control unit formed in a cylindrical shape is arranged along an outer circumference in an axial direction of said one electrode through a plasma generating area formed of a gap;
another electrode of the plurality of electrodes is arranged around the outer circumference of the discharge position control unit; and
a plasma generating gas is supplied into the plasma generating area to generate plasma.

5. The plasma generation device according to claim 1, wherein the plurality of electrodes are arranged along an outer periphery of the discharge position control unit at equal intervals; and the discharge position control unit comprises a treatment space, in the inside of which a plasma treatment object is stored.

6. The plasma generation device according to claim 5, wherein the plurality of electrodes are respectively connected with power supplies; and the power supplies are controlled so that each phase difference between the mutual adjacent power supplies is respectively different by an equal interval so as to be a total of 360° phase difference.

7. The plasma generation device according to claim 2, wherein the discharge position control unit comprises a partitioned area arranged to plurally partition the inverse characteristic material facing one of the plurality of electrodes.

8. The plasma generation device according to claim 2, wherein:
one electrode of the plurality of electrodes is formed of a linear shaped conductor;
the discharge position control unit formed in a cylindrical shape is arranged along an outer circumference in an axial direction of said one electrode through a plasma generating area formed of a gap;
another electrode of the plurality of electrodes is arranged around the outer circumference of the discharge position control unit; and
a plasma generating gas is supplied into the plasma generating area to generate plasma.

9. The plasma generation device according to claim 2, wherein the plurality of electrodes are arranged along an outer periphery of the discharge position control unit at equal intervals; and the discharge position control unit comprises a treatment space, in the inside of which a plasma treatment object is stored.

10. The plasma generation device according to claim 9, wherein the plurality of electrodes are respectively connected with power supplies; and the power supplies are controlled so that each phase difference between the mutual adjacent power supplies is respectively different by an equal interval so as to be a total of 360° phase difference.

11. The plasma generation device according to claim 7, wherein:
one electrode of the plurality of electrodes is formed of a linear shaped conductor;
the discharge position control unit formed in a cylindrical shape is arranged along an outer circumference in an axial direction of said one electrode through a plasma generating area formed of a gap;
another electrode of the plurality of electrodes is arranged around the outer circumference of the discharge position control unit; and
a plasma generating gas is supplied into the plasma generating area to generate plasma.

12. The plasma generation device according to claim 7, wherein the plurality of electrodes are arranged along an outer periphery of the discharge position control unit at equal intervals; and the discharge position control unit comprises a treatment space, in the inside of which a plasma treatment object is stored.

13. The plasma generation device according to claim 12, wherein the plurality of electrodes are respectively connected with power supplies; and the power supplies are controlled so that each phase difference between the mutual adjacent power supplies is respectively different by an equal interval so as to be a total of 360° phase difference.

14. The plasma generation device according to claim 3, wherein:
one electrode of the plurality of electrodes is formed of a linear shaped conductor;
the discharge position control unit formed in a cylindrical shape is arranged along an outer circumference in an axial direction of said one electrode through a plasma generating area formed of a gap;
another electrode of the plurality of electrodes is arranged around the outer circumference of the discharge position control unit; and
a plasma generating gas is supplied into the plasma generating area to generate plasma.

15. The plasma generation device according to claim 3, wherein the plurality of electrodes are arranged along an outer periphery of the discharge position control unit at equal intervals; and the discharge position control unit comprises a treatment space, in the inside of which a plasma treatment object is stored.

16. The plasma generation device according to claim 15, wherein the plurality of electrodes are respectively connected with power supplies; and the power supplies are controlled so that each phase difference between the mutual adjacent power supplies is respectively different by an equal interval so as to be a total of 360° phase difference.

* * * * *